July 7, 1925.
E. F. FARNSWORTH
MACHINE FOR FREEING BLUEBERRIES FROM PARASITES
Filed Oct. 29, 1924
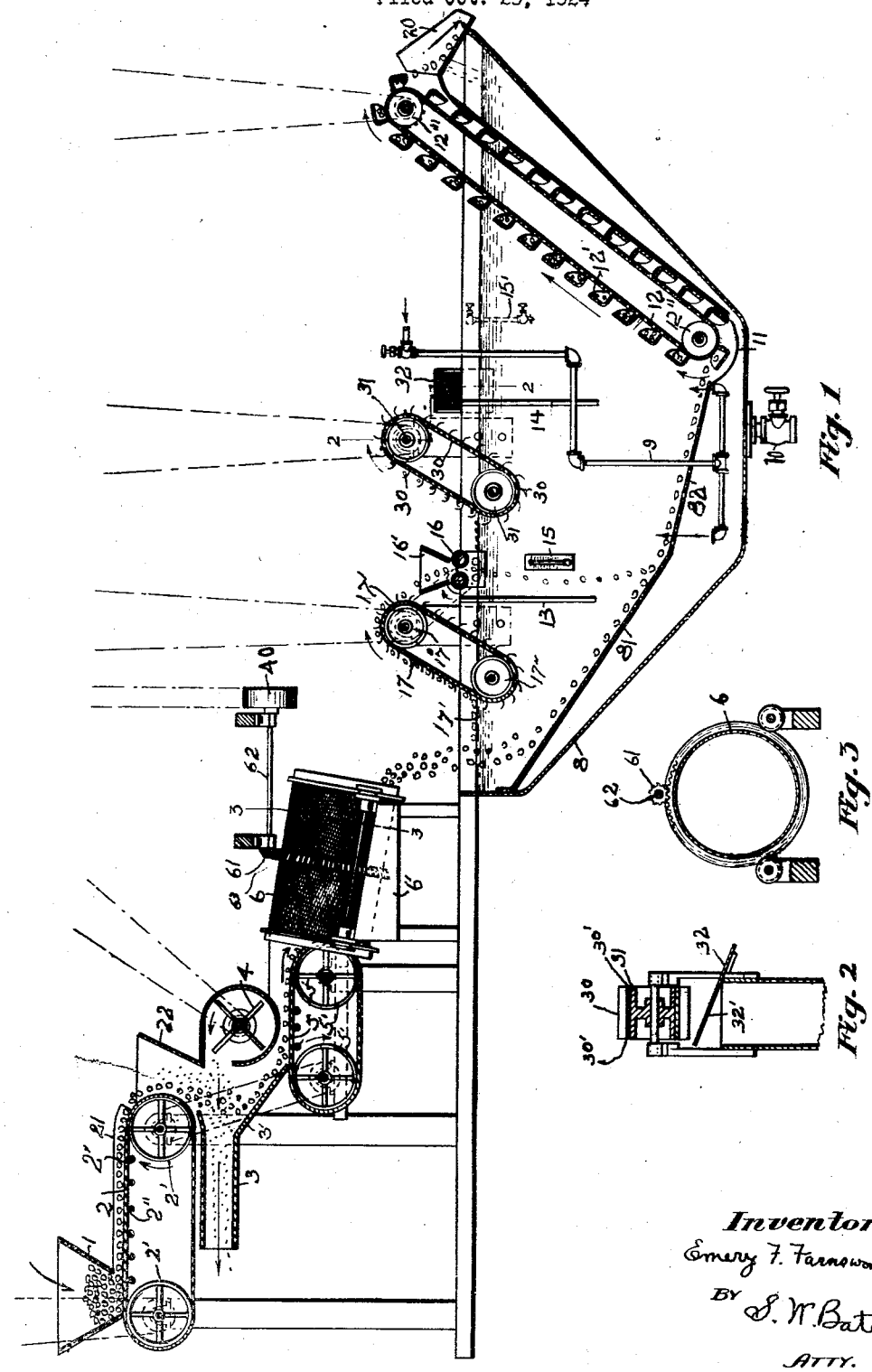
Inventor.
Emery F. Farnsworth
BY S. W. Bates
ATTY.

Patented July 7, 1925.

1,544,894

UNITED STATES PATENT OFFICE.

EMERY F. FARNSWORTH, OF SOUTH PORTLAND, MAINE.

MACHINE FOR FREEING BLUEBERRIES FROM PARASITES.

Application filed October 29, 1924. Serial No. 746,544.

*To all whom it may concern:*

Be it known that I, EMERY F. FARNSWORTH, a citizen of the United States, residing at South Portland, in the county of Cumberland and State of Maine, have invented certain new and useful Improvements in Machines for Freeing Blueberries from Parasites, of which the following is a specification.

My invention relates to the removal of certain parasites which I call the "blueberry parasite" and which attach themselves to blueberries and had given so much trouble in blueberry territory, that it practically had amounted to destroying the crops at least for canning purposes.

The attention of the United States Government has been attracted by the presence of these parasites and so serious did the question become during the last summer that no blueberries were allowed to be canned which had the parasite attached to them and no means had been devised by which the blueberries and parasite could be separated mechanically so that no blueberries would be free from the parasites.

By careful study of the habits of the blueberry parasite, which is an animal about half the size of a grain of rice, it has been discovered that if the blueberries are submerged in water at a temperature of 125 degrees F. they will at once leave the blueberries sinking to the bottom of the water and can then be easily removed.

My invention consists therefore, of taking advantage of this fact and by devising a mechanical process and a machine whereby the blueberries while being submerged in water at pratically a temperature of 125 degrees F. are automatically freed from the presence of the parasite.

In carrying out my invention I submerge the blueberries in sufficient quantities so as to be readily handled, keeping the water at a uniform temperature of 125 degrees F.

The berries or at least 90% of them will sink in the water and they are supported beneath the water by a screen preferably at a considerable inclination to the surface of the water in the tank.

The screen is of a mesh sufficiently coarse to support the blueberries and to allow the parasite to sink.

I have illustrated my process by means of the accompanying drawing in which:—

Fig. 1, is a central longitudinal section through the apparatus,

Fig. 2, is a cross section on the line 2—2 of Fig. 1, and

Fig. 3, is a cross section on the line 3—3 also of Fig. 1.

Referring to the drawing 1 represents a hopper in which blueberries are first poured, the lower end of said hopper discharging on the upper surface of an endless belt 2 running over a pair af cylinders 2'.

The upper portion of the endless belt is held flat and true by cross-rods 2''.

The outlet to the hopper 1 consists of a flat cover 21 extending over the belt 2 and forming a flat thin opening through which the berries pass discharging over the surface of the end of the belt.

Around the end of the discharge belt 2 is formed a hopper 22 into which the blueberries are discharged from the endless belt.

From the lower end of the hopper 22 is a duct 3 extending backwardly beneath the belt 2 for discharging leaves, stems and the like which are blown out by the fan 4.

A blast of air from the blower or fan 4 held in a casing connecting with the lower end of the hopper 22 is forced backwardly through the blueberries and dropped from the belt 2.

These blueberries are practically winnowed by the fan 4 and the waste material is blown backwardly and out of the way.

From the hopper 22 the berries drop onto an inclined plate 3' down which they roll and land on an endless belt 5 passing over the cylinders 5'.

The cylinders 2' and 5' with their supported belts feed the berries forward in a similar way.

The belt 5 is much shorter than the belt 2 and deposits the berries on the interior of the rotating cylindrical screen 6, which is preferably inclined forward in the way in which the berries are moving.

The screen 6 is rotated by an annular gear 63 which passes around the center of the screen and engages with a bevel gear 61 on the end of the shaft 62 rotated by a pulley 40 connected with some suitable source of power, as an electric motor.

When the berries leave the cylindrical screen 6 they fall at once into the elongated tank 8 having at the inlet end an inwardly sloping screen 81. The lower end of the screen 81 connects with a screen 82 having a somewhat less slope.

This tank is made relatively long and narrow.

The coarseness of the screens 81 and 82 is such that while they will support the berries they will allow the parasites to pass through and fall to the bottom of the tank.

The berries naturally sink in the water or about 90% of them do and roll down the screens 81 and 82 and are scooped up by the wire buckets 12' secured to an endless belt 12 passing over rolls 12''. The berries are delivered above the top of the tank 8 to a delivery chute.

The speed of the buckets may be regulated so that they can have any desired amount of time in passing through the machine.

The delivery buckets 12' with their belts 12 are disposed in an inclined position at the delivery end of the tank and the blueberries freed from parasites are delivered into the chute 20.

Means are provided for keeping the water in the tank at a temperature of 125 degrees F. and for this purpose I submerge in the water the thermometer 15 and I place in the side of the tank the water glass 15' for determining the height of the water.

Means are provided for squeezing the air from the blueberries which float so that they will fall onto the screens 81 and 82 and join with the blueberries which sink.

I also provide means for freeing the tank from floating stems, leaves and the like, so that they will not become mixed with the good berries.

For this purpose I place in an inclined position near the entrance of the tank a series of buckets 17 attached to an endless belt 17' running over pulleys 17'' disposed in a position one above the other so that the entire belt will have a position inclined to the tank, so that the buckets will lift the floating blueberries out of the water and discharge them into a hopper 16' located near the top of the endless belt.

Thus all the blueberries that float are gathered in by the buckets 17 and dropped into the hopper 16' thence they pass through a pair of rollers 16 located at the bottom of the hopper 16'.

The rollers 16 are separated just far enough so that they will exert a squeezing effect on the berries enough to expel the air from them sufficiently to cause them to sink.

A diaphragm 13 is placed in the water between the endless belt 17 and the rolls 16 and extends across the tank to keep the perfect blueberries, which are being squeezed by the rolls 16 from becoming mixed with floating stems, leaves etc. which are liable to come into the tank with the screened blueberries of the tank 6.

A series of buckets 30 closely adjacent to the edge of the tank are attached to an endless belt 30 running over pulleys 31 provided for gathering up floating material and discharging it on to a laterally inclined screen 32 from which it is conveyed out of the tank and discharged (see Fig. 2).

The mesh of the screen intended to support the blueberries is found by actual experiments to be six to the inch. This enables the parasite to sink and the berry to float.

While I have specified 125 degrees a temperature in the water as being sufficient to drive the parasite from the blueberry, there may be instances where this temperature will not be sufficient to free the parasite but whatever temperature is used and which drives the parasite by an uncomfortable degree of heat which apparently tends to make him uncomfortable is sufficient to come within the terms of my invention and is so understood by me.

Whatever the temperature may be it must be sufficient so that the screen will enable the berry to float and allow the parasite to sink because it is this fact which enables my machine to do its work and to free the blueberry from its parasite.

It will be seen that the constant movement of the buckets 17, 30 and 12 will have a tendency to keep the water constantly stirred up so that the blueberries as they roll down the screen 81 will be kept continually in motion so that they will not fail to roll from the lower end of the screen 82 and to be carried to the point of discharge.

I claim:—

1. The means of treating a mass of mixed heavier and lighter blueberries consisting of a tank, means for subjecting the berries while in said tank to treatment of a fluid to drive out the parasite, means for expelling a portion of the air from the lighter blueberries until they sink, means for separating the blueberries from the parasites.

2. Means for treating a mass of blueberries consisting of a tank, means for introducing a heated fluid therein, an inclined screen in said tank for supporting said blueberries and allowing the parasites to pass downwardly therethrough, and means for separating said parasites from said blueberries.

3. Means for treating a mass of blueberries consisting of a tank, means for introducing a heating fluid therein, an inclined screen in said tank for supporting said blueberries and allowing the parasites to pass downwardly therethrough, and means for agitating the berries while on said screen.

4. In an apparatus for separating blueberries from the blueberry parasite, the combination of a hopper for receiving the blueberries, an endless belt rotating beneath said hopper for spreading said berries, an inclined spout upon which said blueberries are delivered, an endless corrugated belt for receiving said berries, an inclined cylindrical rotating screen for receiving the berries, a tank of hot water and means for delivering the berries into said tank, an inclined screen in said tank and a receiving and collecting apparatus for receiving said blueberries from said screen.

5. In an apparatus for separating blueberries from the blueberry parasite, the combination of a hopper for receiving the blueberries, means beneath the hopper for spreading the blueberries, a screen for separating green from ripe berries, a fan mill for winnowing the blueberries, means for delivering the same to said screen, means for rotating said screen, a tank for heated water and means for delivering the berries into said tank.

6. In an apparatus for separating blueberries from the blueberry parasite, the combination of a hopper for receiving the blueberries, an endless belt rotating beneath said hopper for spreading said berries, a winnowing fan for blowing through said blueberries as they drop from said belt, an endless corrugated band for receiving the blueberries after they pass through said winnowing apparatus, an inclined cylindrical rotating screen into which the berries pass, means for rotating said screen to deliver said berries into heated water in a water tank, an inclined screen with a longitudinal inclination beneath the water of said tank, and means for agitating said water.

7. A device for freeing blueberries from the blueberry parasite, consisting of a tank for containing water at a relatively high temperature, an inclined screen beneath the surface of the water in said tank, said screen being fine enough to support the blueberries and coarse enough to allow the parasite to pass through and sink.

8. A device for freeing blueberries from the blueberry parasite, which consists of a tank for holding relatively hot water, an inclined screen for sustaining the berries and allowing the parasite to sink, an endless line of wire buckets for catching the floating blueberries, a hopper for receiving said blueberries, a pair of rolls for receiving the blueberries from the hopper to crush the same, said rolls being spaced apart just sufficient to squeeze out the air to cause them to sink.

9. A device for freeing blueberries from the blue berry parasite consisting of a tank containing water at a temperature sufficient to expel the parasite, an inclined screen beneath the water in said tank upon which the blueberries are supported, said screen being fine enough to support the blueberries and coarse enough to allow the parasite to pass through in the water, an endless line of buckets to catch the floating blueberries and lift them out of the water, a hopper for receiving the blueberries from the buckets, a pair of rolls for receiving the blueberries from said hopper to squeeze the same, said rolls being spaced apart just sufficiently to squeeze the air from the same to cause them to sink and join the whole blueberries on said screen.

10. In a device for freeing blueberries from the blueberry parasite, consisting of a tank adapted to contain water at a relatively high temperature, an inclined screen in said tank for causing said blueberries to pass down the inclination of said screen, an endless line of buckets for receiving the blueberries from the lower portion of said tank and lifting the same from the water, an endless belt adjacent to the surface of the water, a series of fingers attached to said belt for lifting waste and débris from said water and means for receiving and discharging it out of said tank.

11. An apparatus for freeing blueberries from the blueberry parasite, which consists of a tank of water, an inclined screen in said tank, means for keeping the water of the tank at a temperature sufficient to expel the parasite from the berry, means for feeding the blueberries to said screen, an endless chain of wire buckets to receive the blueberries from said inclined screen and to discharge the same at a collecting point.

12. An apparatus for freeing blueberries from the blueberry parasite, which consists of a tank of water, an inclined screen in said tank, means for keeping the tank at a temperature to force out the parasite, means for collecting the blueberries as they roll down said screen freed from the parasite and for discharging them into an endless line of discharge scoops.

13. An apparatus for freeing blueberries from the blueberry parasite, which consists of a tank adapted to contain heated water, a screen in said tank for supporting blueberries, an endless band containing buckets for scooping up and discharging the floating blueberries, a hopper for receiving said scooped-up blueberries, a pair of rolls adjustably held together for pressing said blueberries therebetween and to squeeze the air therefrom.

14. The process of freeing light, and heavier blueberries from the blueberry parasite which consists in subjecting them to the action of a fluid to drive out the parasite, agitating the berries while subjected to the action of said fluid causing the lighter berries to accumulate with the heavier berries and then separately removing the berries and the parasite.

15. The process of freeing blueberries from the blueberry parasites which consists in subjecting them to the action of water at a temperature of substantially 125° F. to drive out the parasites, supporting said berries on an inclined screen, agitating the blueberries while subjecting them to the action of the heated water, then separating the berries from the parasites.

16. The process of freeing blueberries from the blueberry parasites which consists in immersing them in water at a temperature of substantially 125° F., supporting said berries while submerged in the water on an inclined screen sufficiently fine to support the berries and to allow the parasites to pass through and sink, and finally elevating said berries out of the water and depositing them at a collecting point.

17. The process of freeing blueberries from the blueberry parasite which consists in immersing them in water at a temperature sufficiently high to drive out the parasites, and allowing them to sink, supporting said berries on an inclined screen, and finally elevating said berries out of the water and depositing them at a collecting point.

EMERY F. FARNSWORTH.